US009025208B2

(12) United States Patent
Kisilev et al.

(10) Patent No.: US 9,025,208 B2
(45) Date of Patent: May 5, 2015

(54) DETERMINING NEW COLOR VALUES OF AN IMAGE BASED ON AN ACTIVITY MAP (75) Inventors: Pavel Kisilev, Maalot (IL); Renato Keshet, Haifa (IL); Michal Aharon, Haifa (IL); Carl Staelin, Haifa (IL); Yohanan Sivan, Raanana (IL); Gregory Braverman, Hertzelia (IL); Lior Shapira, Tel Aviv (IL); Boris Oicherman, Jerusalem (IL)

(73) Assignee: Hewlett-Packard Development Company, L.P., Houston, TX (US)

( * ) Notice: Subject to any disclaimer, the term of this patent is extended or adjusted under 35 U.S.C. 154(b) by 0 days.

(21) Appl. No.: 14/344,129

(22) PCT Filed: Sep. 29, 2011

(86) PCT No.: PCT/US2011/054024
§ 371 (c)(1),
(2), (4) Date: Mar. 11, 2014

(87) PCT Pub. No.: WO2013/048416
PCT Pub. Date: Apr. 4, 2013

(65) Prior Publication Data
US 2014/0340697 A1    Nov. 20, 2014

(51) Int. Cl.
*H04N 1/58* (2006.01)
*H04N 1/60* (2006.01)
*G06F 3/12* (2006.01)
*G06K 15/02* (2006.01)

(52) U.S. Cl.
CPC .......... *G06K 15/1872* (2013.01); *G06F 3/1208* (2013.01); *G06F 3/1219* (2013.01); *G06F 3/1247* (2013.01); *G06F 3/1279* (2013.01); *H04N 1/6016* (2013.01); *G06K 15/188* (2013.01); *H04N 1/6022* (2013.01)

(58) Field of Classification Search
None
See application file for complete search history.

(56) References Cited

U.S. PATENT DOCUMENTS

| 7,688,470 B2 | 3/2010 | Monga et al. |
| 7,715,044 B2 | 5/2010 | He |
| 7,729,014 B2 | 6/2010 | Falk et al. |
| 7,847,975 B2 | 12/2010 | Wen |
| 2004/0252131 A1 | 12/2004 | Gondek et al. |
| 2006/0072127 A1* | 4/2006 | Herron ........................ 358/1.9 |

(Continued)

FOREIGN PATENT DOCUMENTS

| JP | 2007-180607 A | 7/2007 |
| JP | 2007-235679 A | 9/2007 |

(Continued)

OTHER PUBLICATIONS

HPDC, International Search Report & Written Opinion dated May 23, 2012, PCT App. No. PCT/US2011/054024, International Filing Date: Sep. 29, 2011, 9 p.

*Primary Examiner* — Scott A Rogers
(74) *Attorney, Agent, or Firm* — Conley Rose (57) ABSTRACT

A method comprises computing an activity map for an input image. The activity map indicates an amount of variable spatial activity in the input image. The method further comprises producing an output image based on the activity map, and controlling a printhead to cause the output image to be printed. The output image contains a plurality of color pixels and each such color pixel is represented by at least one of cyan (C), magenta (M), yellow (Y), and black (K) in a color space.

20 Claims, 9 Drawing Sheets (56) References Cited

U.S. PATENT DOCUMENTS

2007/0153308 A1 7/2007 Zemach et al.
2010/0157372 A1 6/2010 Qiao et al.

FOREIGN PATENT DOCUMENTS

| JP | 2008-135006 A | 6/2008 |
|----|---------------|--------|
| JP | 2011-015152 A | 1/2011 |

* cited by examiner

DETERMINING NEW COLOR VALUES OF AN IMAGE BASED ON AN ACTIVITY MAP

CROSS-REFERENCE TO RELATED APPLICATION

The present application is the U.S. National Stage under 35 U.S.C. §371 of International Patent Application No. PCT/US2011/054024, filed 29 Sep. 2011, the disclosure of which is hereby incorporated herein by reference.

BACKGROUND

Printing images is a highly prevalent practice. Digital printing presses and inkjet printers produce images on print media by applying dots of ink arranged in halftone patterns. The cost of ink is substantial.

BRIEF DESCRIPTION OF THE DRAWINGS

For a detailed description of various examples, reference will now be made to the accompanying drawings in which.

DETAILED DESCRIPTION

Printing systems in accordance with various embodiments use different colors of ink such as cyan (C), magenta (M), yellow (Y), and black (K). The letter "K" is used for black to differentiate black from blue which often is represented by the letter B. Although examples employing CMYK-based printing systems are discussed herein, the techniques disclosed apply to other color-spaces as well.

The ink colors C, M, and Y (referred to also as "CMY") reproduce the desired color shades, while black ink serves a dual purpose: enhancing the image quality and saving ink. When applied in proper quantities, the combination of CMY inks can faithfully reproduce gray shades and also black. However, the images printed with only CMY inks (i.e., no black) suffer from two problems: excessive use of ink and reduced dynamic range. The excessive use of ink problem results from the fact that many CMY color combinations contain a certain amount of grey component. If this CMY component were replaced with an achromatic ink (black or grey), the total amount of ink in the image would be reduced without any change in color. That is, a given desired color can be produced by multiple different combinations of the four CMYK ink colors. The more black ink is used, the less CMY ink is needed resulting in a net overall savings of ink usage. Thus, adding more black ink advantageously saves on ink and may help achiever darker blacks and richer detail thus enhancing an image's dynamic range. The techniques described herein permits the resulting colors of the printed image to be perceived the same to the human brain despite less ink being used.

Certain areas of some images, however, may appear to have a visual artifact (e.g., graininess, which is the subjective perception of "noise" in a printed image and generally comprises high-frequency aperiodic fluctuations) if an increased amount of black was used to produce the desired color. Some skin tones or blue skies, for example, may appear grainier with an increase in black ink usage. The basic color would be the same with an increased usage of black but the resulting image undesirably would appear to be grainier.

Some images or portions of an image have a fair amount of texture (e.g., trees, grass, etc.) and humans generally do not perceive an increase in graininess for such images when more black ink is used. Moreover, using more black ink saves on overall ink usage but may result in poorer image quality in some images or some portions of a given image.

In accordance with the various examples described herein, the amount of black ink used to print a given image varies across different portions of an image. An input image is processed in a way that uses more black ink in portions of an image that have higher spatial activity, for which graininess is not perceived, and less black ink in other portions for which graininess would be more of a perceptual problem. The disclosed technique includes the computation of an "activity map" for the input image and then the recalculation of the CMYK values for the image based on the activity map. The activity map indicates the amount of spatial activity in the input image across the image such as on a pixel-by-pixel basis. Spatial activity may be high for areas of the image having a high degree of texture and low in areas of image having a low degree of texture.

Figure 1:
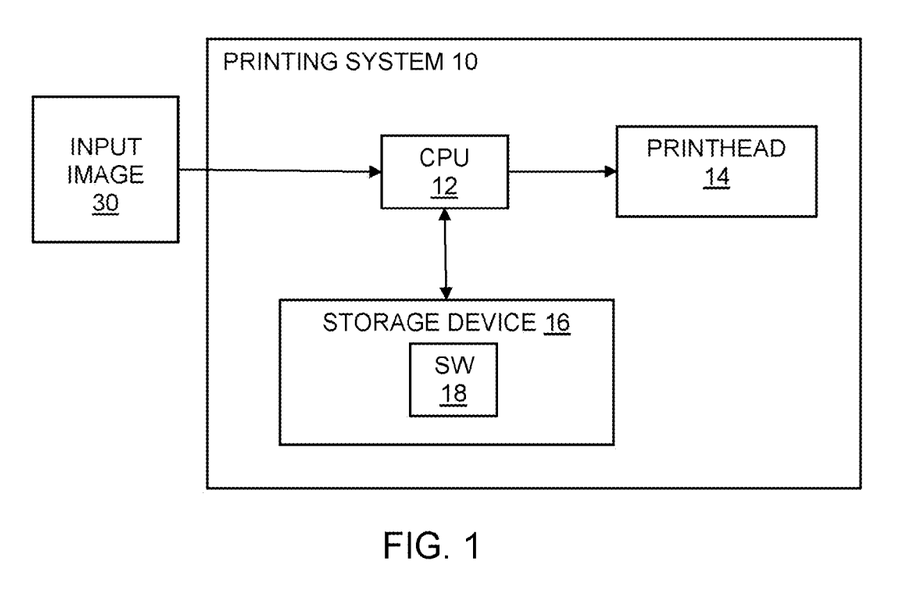
FIG. 1 shows a printing system in accordance with various examples.

FIG. 1 illustrates a printing system 10 in accordance with various embodiments. The printing system comprises a central processing unit (CPU) 10 coupled directly or indirectly to a printhead 14 and a storage device 16 containing software 18. The printhead may comprise multiple colors of ink such as cyan, magenta, yellow and black in one or more separate reservoirs. The CPU 10 can cause the printhead 14 to emit any of the available colors of ink one drop at a time onto print media. The CPU 10 thus controls the operation of the printhead 14 to cause an image to be printed. The image comprises multiple color values in, for example, CMYK color space. The storage device comprises non-transitory storage such as random access memory (RAM), read-only memory (ROM), a hard disk drive (HDD), Flash storage, etc. The CPU 10 executes software 18 which comprises machine executable instructions. The software 18 may perform multiple functions, at least one of which is the functionality described herein to process input images 30 in a way that saves ink while maintaining sufficient image quality. In some examples, the software 18 comprises a printer driver. That is, the functionality described herein may be integrated into a printer driver.

In some embodiments, the printing system 10 comprises a digital printing press while in other embodiments, the printing system comprises a computer containing the CPU 10, storage device 16, and software 18 coupled to a printer containing the printhead 14. As a digital printing press, the printing system 10 "RIPs" all images and documents to be printing. RIPping an image flattens the image, if the image contains multiple layers, and converts the colors of each pixel from the input color space to the device coordinates (CMYK). After that, the digital printing press prepares each sheet of paper to be printed, and determines the halftoning patterns to use for each ink (the screen).

Figure 2:
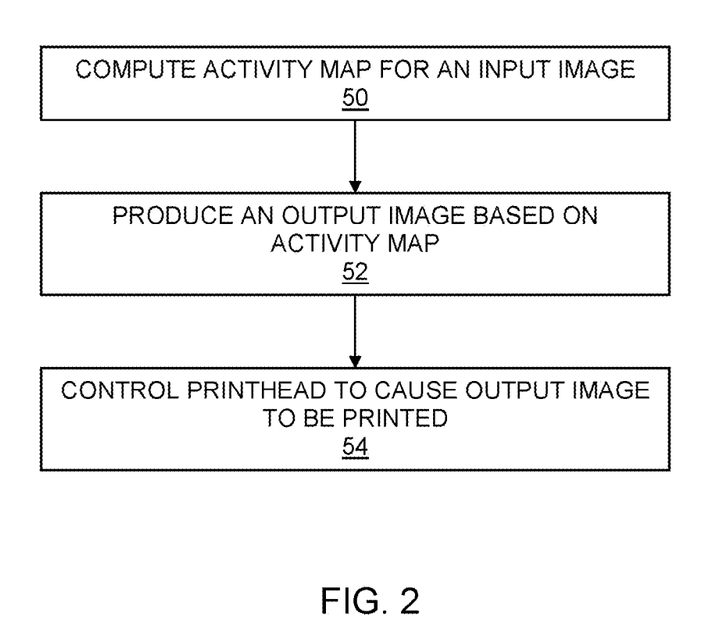
FIG. 2 shows a method in accordance with various examples.

FIG. 2 shows a method in accordance with various embodiments for processing an input image to save ink while maintaining image quality. The method may be performed by the CPU 10 executing software 18.

At 50, the method comprises computing an activity map for the input image 30. The activity map indicates the amount of spatial activity in the input image on a pixel-by-pixel basis. A variety of techniques for computing the activity map are possible. One such technique will be described below with reference to FIG. 3 and is based on entropy.

Referring still to FIG. 2, at 52, for the pixels of the input image 30, new CMYK values are determined by the CPU 10 based on the activity map to thereby generate an output image to be printed. Based on the activity map, some areas of the image may be printed with increased usage of black ink without a noticeable increase in graininess, while other areas of the image may use little or no black ink because those latter areas would be unacceptably grainy if more black ink was used. At 54, the CPU 10 controls the printhead 14 to cause the output image to be printed.

Figure 3:
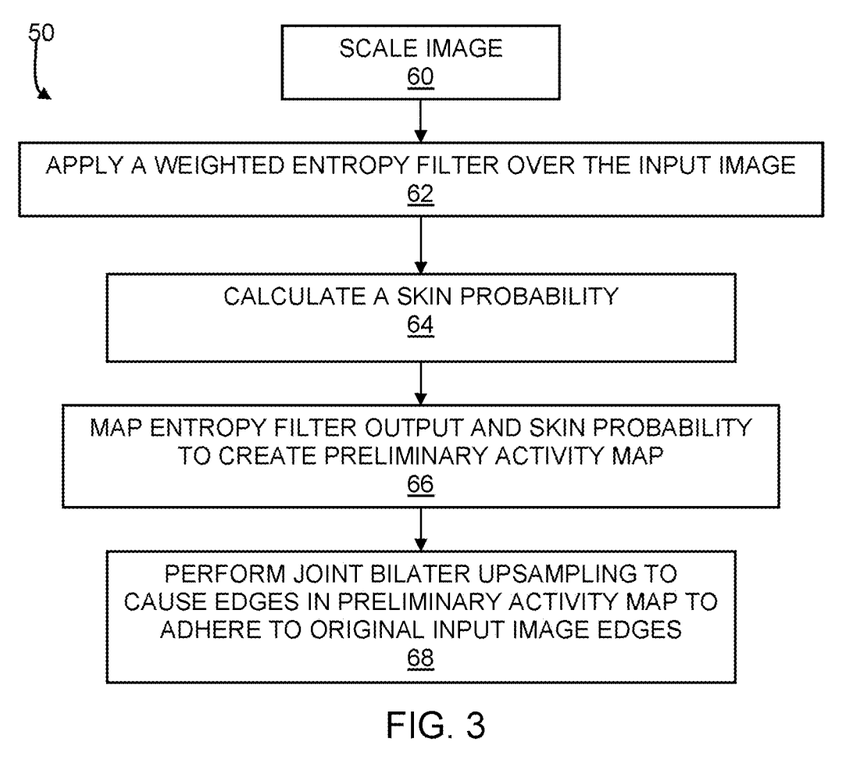
FIG. 3 shows a method of producing an activity map of an input image in accordance with various examples.
Figure 4:
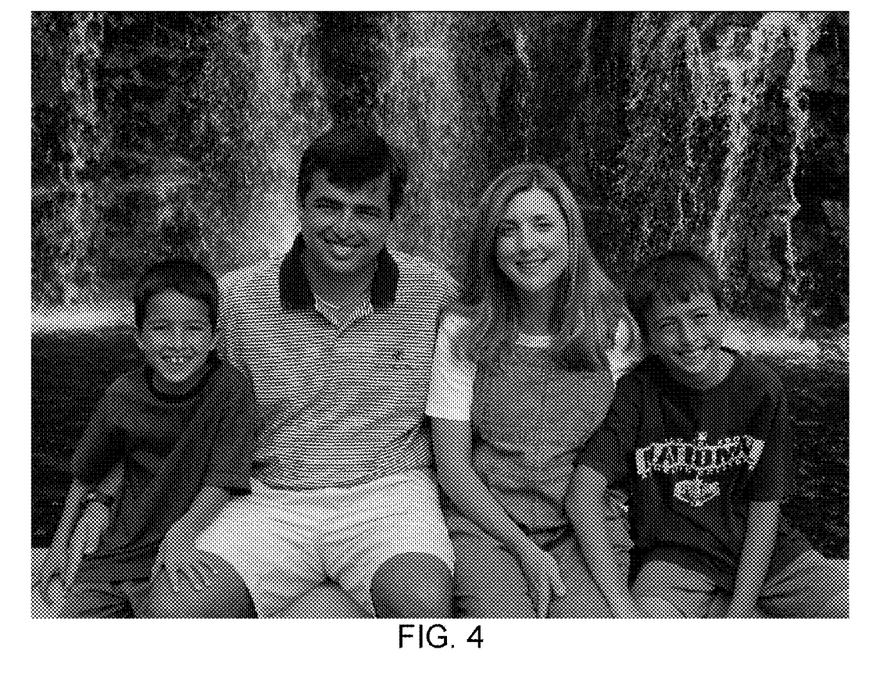
FIGS. 4-8 show various illustrative images of the intermediary actions to generate an activity map in accordance with various examples.

As noted above, determination of an activity map of the input image can be made in accordance with a variety of techniques. For instance, FIG. 3 provides a method based on entropy. The method of FIG. 3 may be performed by CPU 10 executing software 18. FIG. 4 shows an example input image (color not shown in FIG. 4).

At 60 in FIG. 3, the method comprises scaling the input image 30 to, for example, 240 dots per inch (DPI). By scaling all input images to the same resolution, detail size in all processed images is the same. In some examples, the target resolution is 240 DPI, but can be different than 240 DPI in other examples.

At 62, the method comprises applying a weighted entropy filter over the image to produce a weighted entropy filter output. Image entropy is a measure of the uncertainty associated with an image. The value of entropy is higher the closer the image is to "white noise." A localized entropy filter is calculated on a gray level image. For each pixel p, a gray level histogram H is computed of 256 bins for the 9×9 (or other size) neighborhood $N_p$ around he pixel. A function w is then defined as 1-G(mean($N_p$),8) where G is a Gaussian, centered around the mean of $N_p$, with a variance of 8 gray levels. The number of gray levels for the variance can be other than 8. The weighted entropy (we) is then computed as:

$$we = \sum_{i \in [0,255]} w(i) * p_i * \log(p_i))$$

Figure 5:
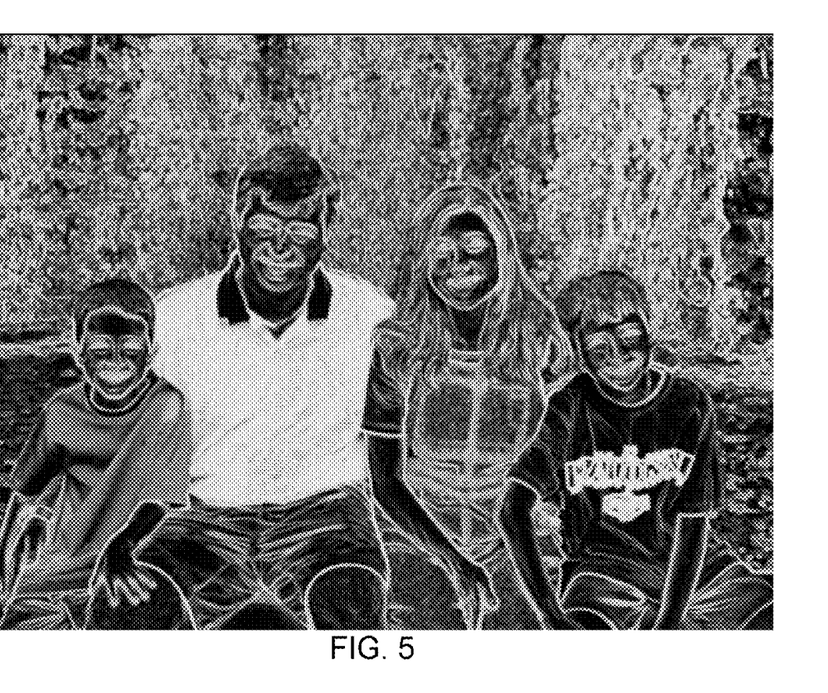

With weighted entropy, small variations around the neighborhood of a pixel do not increase the level of entropy. FIG. 5 shows an example of a weighted entropy computation for the input image of FIG. 4.

Figure 6:
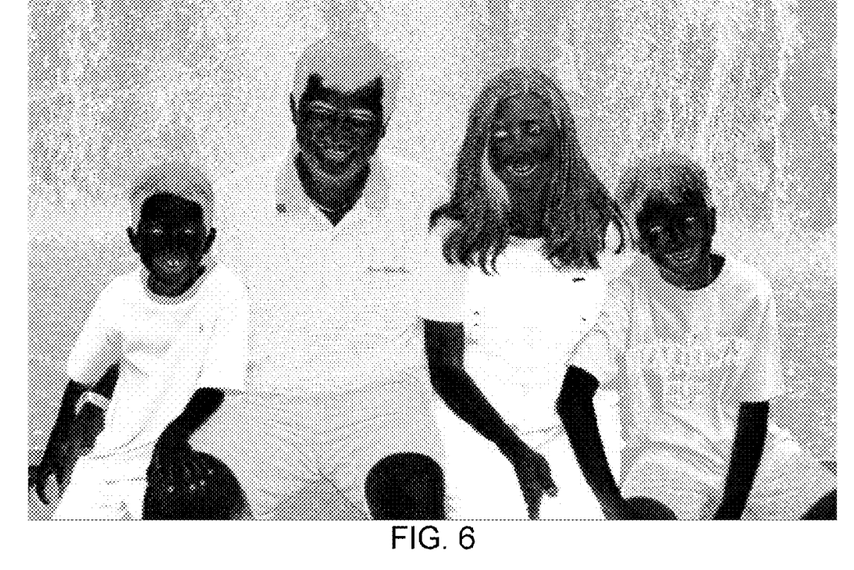

Humans are sensitive to artifacts on faces and body parts. Therefore, in accordance with various embodiments, a value indicative of the probability of skin is computed at 64. The skin probability value indicates the likelihood that a given pixel is part of skin in an image. A suitable skin probability function is as follows:

$$P(\text{skin}, c, h) = e^{\frac{1}{3}\frac{-(c-\mu_c)^2}{2\sigma_c^2} + \frac{2}{3}\frac{-(h-\mu_h)^2}{2\sigma_h^2}}$$

where c and h are the chroma and hue coordinates, respectively, of the pixel, $\mu_c$=22, $\mu_h$=53, $\sigma_c$=25, and $\sigma_h$=25 in various examples. The skin probability value thus uses the chroma and hue coordinates of the pixel to produce a value that is indicative of whether the pixel is part of a person's skin. A pixel that is part of a person's skin will have a high skin probability value and a pixel that is not part of a person's skin will have a low skin probability value. FIG. 6 shows the results of the application of the skin probability function to the input image of FIG. 4.

Figure 7:
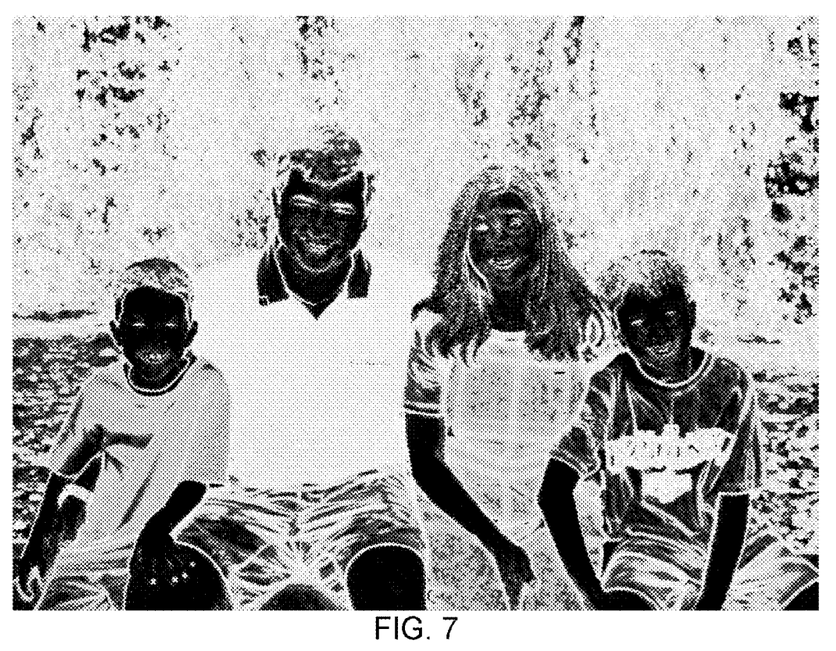
Figure 8:
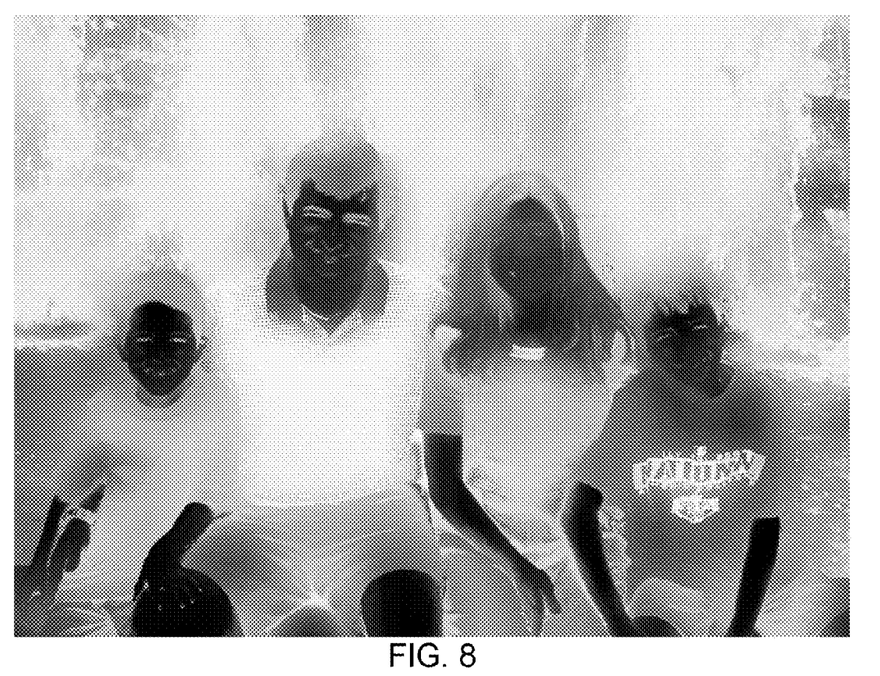

The method in FIG. 3 for computing the activity map further comprises at 66 mapping the weighted entropy filter output computed at 62 and the skin probability values from 64 to create a preliminary activity map. At 68, the method further comprises performing a joint bilateral upsampling to cause edges in the preliminary activity map to adhere to the original input image's edges. This computation can be performed, for example, by blurring the activity map using the edges of the original image. The edges of the various features in the preliminary activity map may have blurry edges due to the patch-based nature of the weighted entropy filter. The upsampling advantageously sharpens the edges and also causes the resulting activity map to be at the resolution of the original input image. FIG. 7 shows the results of the activity map before upsampling has occurred and FIG. 8 shows the results after upsampling (i.e., the final activity map to be used to recompute the CMYK values of the input image).

Another technique for computing an activity map is based on the use of discrete cosine transform (DCT) coefficients in image compression (e.g., JPEG compression). For example, DCT coefficients are computed for overlapping pixel blocks (e.g., 4×4 blocks). The DCT coefficients are then multiplied by Human Visual System (HVS) weighting matrix which is calculated using JPEG quantization tables; the weights are proportional to the quantization step sizes. The resulting activity map then is calculated as the square root of the energy of the weighted DCT coefficients of each block, excluding the DC component, and dividing by the mean lightness value.

Figure 9:
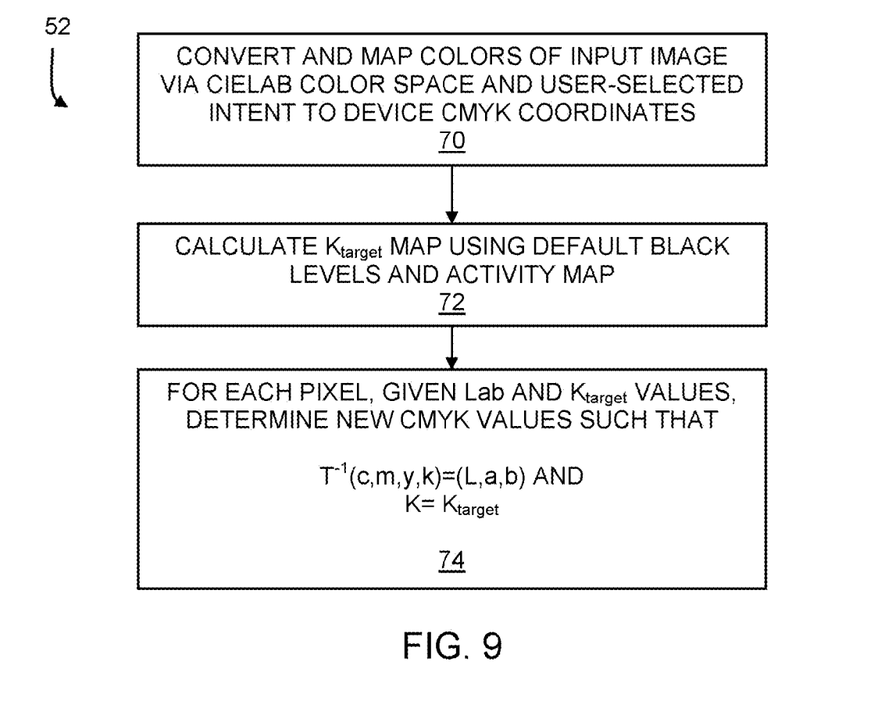
FIG. 9 shows a method of generating new color values based on the activity map in accordance with various examples.

Once the activity map is computed, per action 52 in FIG. 2, new CMYK values are determined for the image based on the activity map. FIG. 9 provides an example of action 52.

An output device International Color Consortium (ICC) profile contains several possible transformations from the Profile Connection Space (PCS) to device color space. Each transformation is referred to as a "rendering intent" and represents a different color reproduction compromise. When applying an ICC profile, a user selects a rendering intent depending on the type of job to be printed. For example, in media-relative colorimetric intent, data is normalized relative to the white point of the print media (e.g., paper). The perceptual rendering intent relaxes constraint on colorimetric accuracy in order to preserve perceptual distance between colors.

For each input image 30, at 70 in FIG. 9 the CMYK values of the input image 30 are converted via CIELAB (CIE 1976 (L*, a*, b*) color space) and a user-selected rendering intent to printing system CMYK coordinates. The resulting CMYK values are within the printing system's color gamut. Therefore, applying the inverse transformation results in PCS (CIELAB) coordinates for each pixel within the printing system's gamut. Moreover, the conversion to CMYK determines the default black (K) color levels, set by the ICC profile.

At 72, $K_{target}$ values are calculated using the default black color levels of the input image and the activity map determined at 50 (FIG. 2). The default K color levels of an area in the image with mostly light pixels are relatively low, while the default K color levels in a darker area are relatively high. Similarly, highly saturate colors tend to contain small amount of K color levels. Therefore, the method takes into account the lightness of each pixel and the proximity to the gamut boundaries when determining the $K_{target}$ values. The value $d_g$ represents the distance between the color of the pixel and the gamut boundary calculated using, for example, the Segment-Maxima technique as described in Morovic, J: "Color Gamut Mapping," Wiley, 2008, incorporated herein by reference. The value $d_g$ represents the distance between the pixel luminance and the profile white point. The $K_{target}$ value for each pixel is computed as follows:

$$K_{target}=(1-a)*k_{default}+a*mi(M_g(d_g),M_l(d_l))$$

where a is the activity level from the activity map of the pixel, $M_g$ and $M_l$ are mappings from luminance and proximity to gamut boundary, to maximum K values. The result is a map of black ink levels that are augmented in areas of high activity to a degree that will not cause visual artifacts.

Referring still to FIG. 9, at 74, the method comprises, for each pixel and given (l, a, b, $K_{target}$) values, determining new CMYK values such that the following constraints are minimized:

1. $\|T(c, m, y, k)-(l, a, b, K_{target})\|$
2. $\|K_{target}-K\|$

The printing system's ICC profile is used to construct this function. The ICC profile contains forward and backward transformations of type $T_{fwd}$:LAB->CMYK and $T_{back}$:CMYK->LAB. These transformations are based on colorimetric measurements performed on the printing system.

To perform action 74, the CPU 10 constructs a transformation $T_{inksave}$:LABK->CMYK. To construct this transformation, the CPU 10 generates a data structure by sampling the CMYK space uniformly using, for example $40^4$ samples, that is 40 samples along each of the four dimensions, transforming the sampled CMYK values into LAB using $T_{back}$, and storing the transformed LAB values in a data structure D which supports nearest-neighbors (NN) queries. Each LAB entry is linked to its originating CMYK coordinates.

Given the (l, a, b, $K_{target}$) values, the method performs a NN search in D within a small color shift tolerance (e.g., 0.58e). The result is a group of colorimetrically nearly identical (l, a, b) values. All LAB values in this group satisfy the first constraint listed above ($\|T(c, m, y, k)-(l, a, b, K_{target})\|$. The CPU 10 then selects a value such that its originating (c, m, y, k) coordinates minimize the second constraint, $\|K_{target}-K\|$. If a close enough k value does not exist (beyond a certain tolerance, the CPU 10 interpolates between the two nearest values.

The above discussion is meant to be illustrative of the principles and various embodiments of the present invention. Numerous variations and modifications will become apparent to those skilled in the art once the above disclosure is fully appreciated. It is intended that the following claims be interpreted to embrace all such variations and modifications.

What is claimed is:

1. A method, comprising:
computing an activity map for an input image, wherein the activity map indicates an amount of spatial activity in the input image;
producing an output image based on the activity map, said output image containing a plurality of color pixels, each color pixel represented by at least one of cyan (C), magenta (M), yellow (Y), and black (K) in a color space; and
controlling a printhead to cause the output image to be printed, wherein computing the activity map comprises computing weighted entropy values on a pixel-by-pixel basis.

2. The method of claim 1, further comprising:
converting the input image containing a plurality of color pixels, each color pixel represented by at least one of CMYK in an input color space originally to a CIELAB color space and then with a user-selected rendering intent to a printing system CMYK coordinates with a default K value and then by inverse transformation to profile connection space (PCS) CIELAB coordinates with target K values of the printing system for each pixel within a gamut of the printing system; and
producing the output image in a CMYK color space based on the PCS CIELAB coordinates with target K values.

3. The method of claim 1 wherein computing the activity map further comprises applying a weighted entropy filter based on the input image.

4. The method of claim 3 wherein computing the activity map comprises mapping an output of the entropy filter and skin probability values.

5. The method of claim 2 wherein target black (k) values are determined based both on default black (K) values in the printing system CMYK coordinates and the activity map.

6. The method of claim 5 wherein the absolute difference between the default K values and their respective target K values and the overall absolute difference in color between transformed printing system CMYK coordinates and the PCS CIELAB coordinates with target K values are minimized.

7. A computer-readable storage device containing machine readable instructions that when executed by a central processing unit (CPU), causes the CPU to:
compute an activity map based on entropy for an input image, wherein the activity map indicates an amount of spatial activity in the input image on a pixel-by-pixel basis;
produce an output image based on the activity map, said output image containing a plurality of color pixels, each color pixel represented by at least one of cyan (C), magenta (M), yellow (Y), and black (K) in a color space; and
control a printhead to cause the output image to be printed wherein the machine readable instructions cause the CPU to compute the activity map by computing weighted entropy values.

8. The computer-readable storage device of claim 7 wherein the machine readable instructions cause the CPU to:
convert the input image containing a plurality of color pixels, each color pixel represented by at least one of CMYK in an input color space originally to a CIELAB color space and then with a user-selected rendering intent to a printing system CMYK coordinates with a default K value and then by inverse transformation to profile connection space (PCS) CIELAB coordinates with target K values of the printing system for each pixel within a gamut of the printing system; and
produce the output image in a CMYK color space based on PCS CIELAB coordinates with target K values.

9. The computer readable storage device of claim 8 wherein target K values are based both on default K values and the activity map using the lightness of each pixel and the proximity to boundaries of the gamut.

10. The computer-readable storage device of claim 7 wherein the machine readable instructions cause the CPU to further compute the activity map by computing skin probability values for a plurality of pixels in the input image.

11. The computer-readable storage device of claim 7 wherein the machine readable instructions cause the CPU to further compute the activity map by mapping an entropy filter and skin probability values.

12. The computer-readable storage device of claim 8 wherein the machine readable instructions cause the CPU to determine target K values based both on default K values in the printing system CMYK coordinates and the activity map.

13. the computer readable storage device of claim 12 wherein the absolute difference between the default K values and their respective target K values and the overall absolute difference in color between transformed printing system CMYK coordinates and the PCS CIELAB coordinates with target K values are minimized.

14. A printing system, comprising:
a printhead containing printer ink; and
a central processing unit (CPU) coupled to the printhead to determine an activity map for an input image to produce an output image, and to control the printhead to print the output image on print media, the output image to contain a plurality of color pixels, each color pixel represented by at least one of cyan (C), magenta (M), yellow (Y), and black (K) in a color space and wherein the activity map indicates an amount of spatial activity in the input image on a pixel-by-pixel basis, wherein the CPU computes the activity map by computing weighted entropy values.

15. The printing system of claim 14 wherein the CPU to:
convert the input image containing a plurality of color pixels, each color pixel represented by at least one of CMYK in an input color space originally to a CIELAB color space and then with a user-selected rendering intent to a printing system CMYK coordinates with a default K value and then by inverse transformation to profile connection space (PCS) CIELAB coordinates with target K values of the printing system for each pixel within a gamut of the printing system, and
further determine the activity map for the input image to produce an output image in a CMYK color space based on the PCS CIELAB coordinates with target K values.

16. The printing system of claim 15 wherein target K values are based both on default K values and the activity map using the lightness of each pixel and the proximity to boundaries of the gamut.

17. The printing system of claim 14 wherein the CPU further computes the activity map by computing skin probability values for a plurality of pixels in the input image.

18. The printing system of claim 14 wherein the CPU further determines the color values for the output image based on the activity map and based on a minimization of a constraint.

19. The printing system of claim 15 wherein the PCS CIELAB target K values are determined based on default K values of the printing system CMYK coordinates and the activity map.

20. The method of claim 2 wherein target K values are based both on default K values and the activity map using the lightness of each pixel and the proximity to boundaries of the gamut.

* * * * *

UNITED STATES PATENT AND TRADEMARK OFFICE
CERTIFICATE OF CORRECTION

PATENT NO. : 9,025,208 B2
APPLICATION NO. : 14/344129
DATED : May 5, 2015
INVENTOR(S) : Pavel Kisilev et al.

It is certified that error appears in the above-identified patent and that said Letters Patent is hereby corrected as shown below:

On the Title page, in item (75), Inventors, in column 1, line 5, delete "Hertzelia" and insert -- Herzliya --, therefor.

In The Claims

In column 6, line 14 approx., in Claim 5, delete "(k)" and insert -- (K) --, therefor.

In column 6, line 52, in Claim 9, delete "computer readable" and insert -- computer-readable --, therefor.

In column 7, line 1, in Claim 13, delete "the computer readable" and insert -- The computer-readable --, therefor.

Signed and Sealed this
Sixteenth Day of August, 2016

Michelle K. Lee
*Director of the United States Patent and Trademark Office*